(12) United States Patent
Graham et al.

(10) Patent No.: US 6,412,399 B1
(45) Date of Patent: Jul. 2, 2002

(54) APPARATUS FOR FORM-FRYING SNACK FOOD PRODUCT

(75) Inventors: Lawrence Graham, Corinth; Ponnattu Kurian Joseph, Irving; Todd Charles McNeel, Flower Mound; Kenneth R. Brocker, Plano, all of TX (US); Stephen N. Forti, Stoneham, MA (US); Edward J. Goldman, Foxborough, MA (US); Malcolm E. Taylor, Pepperell, MA (US); Edward L. Dickinson, Littleton, MA (US); Patsy Anthony Coppola, Bedford, MA (US); Richard F. Terrazzano, Salem, NH (US); Andrew C. Harvey, Waltham, MA (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/556,695

(22) Filed: Apr. 24, 2000

(51) Int. Cl.[7] .............. A47J 37/12; A23P 1/10
(52) U.S. Cl. .............. 99/353; 99/404; 99/407; 99/416; 99/443 R; 99/448; 99/472; 425/405.1; 425/437; 425/453
(58) Field of Search .............. 99/353, 403, 404, 99/407, 410, 416, 443 R, 448, 450, 472; 425/453, 405.1, 437

(56) References Cited

U.S. PATENT DOCUMENTS

| | | | | |
|---|---|---|---|---|
| 3,520,248 A | * | 7/1970 | MacKendrick | 99/353 |
| 3,736,862 A | * | 6/1973 | Crommelijnck | 99/353 |
| 3,905,285 A | * | 9/1975 | Campbell et al. | 99/353 |
| 3,911,805 A | * | 10/1975 | Baird | 99/353 |
| 4,354,815 A | | 10/1982 | Bardsley et al. | |
| RE31,819 E | * | 1/1985 | Weiss et al. | 426/439 |

* cited by examiner

Primary Examiner—Keith Hendricks
Assistant Examiner—Drew Becker
(74) Attorney, Agent, or Firm—Rothwell, Figg, Ernst & Manbeck

(57) ABSTRACT

Apparatus and method for cooking snack food pieces features a drum-type fryer which transports individual, die-cut piece preforms through hot oil contained within a cooking tank defined between the periphery of the drum and a housing in which the drum is contained. Vacuum transfer and feed rollers transfer the individual piece preforms from a die-cutting roller assembly onto the drum for cooking, and a similar roller transfers the cooked snack food pieces from the drum to a take-away conveyor for subsequent, downstream processing. The pieces are retained by suction against molding surfaces of frying mold elements distributed over the periphery of the frying drum.

28 Claims, 12 Drawing Sheets

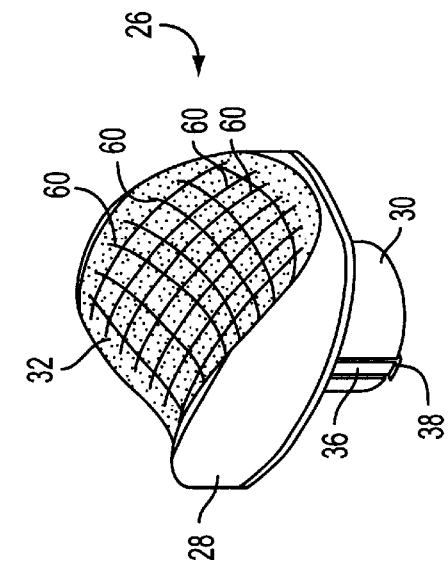
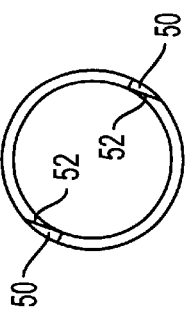
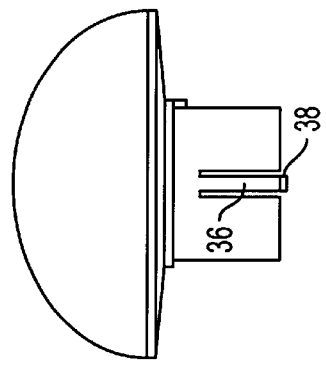
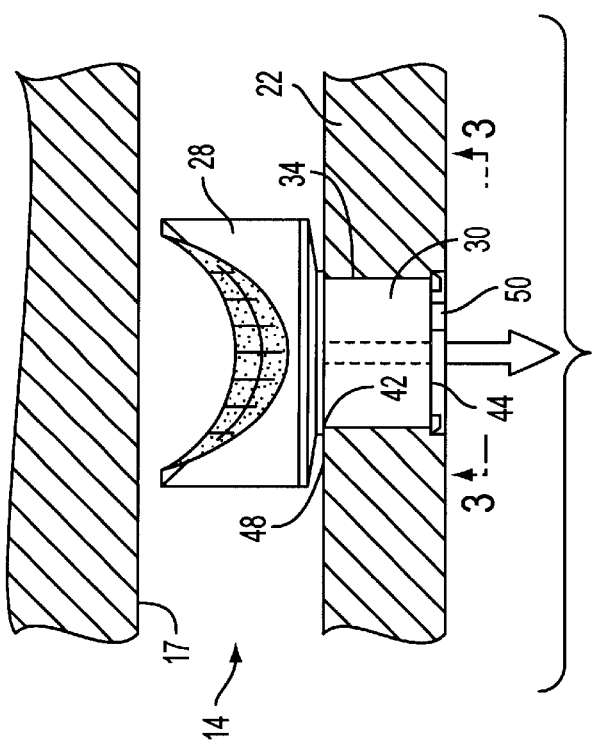
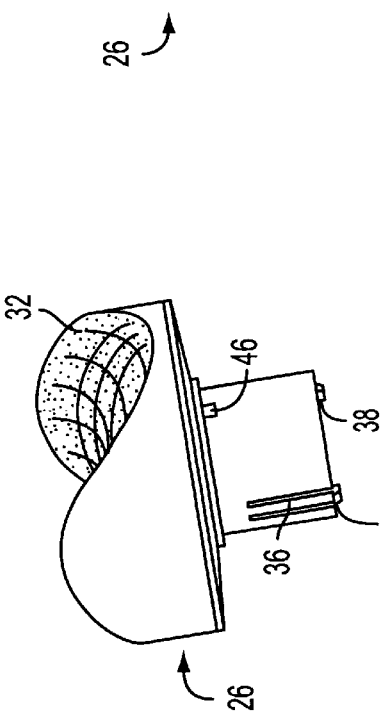

APPARATUS FOR FORM-FRYING SNACK FOOD PRODUCT

FIELD OF THE INVENTION

In general, the invention relates to an apparatus and method for making fabricated snack food products such as potato crisps or tortilla chips. More particularly, the invention relates to an apparatus and method for form-frying such products.

BACKGROUND OF THE INVENTION

In general, snack food chips which are made from potato, corn, or other farinaceous dough and which are formed or fabricated such that the chips all have the same shape and/or configuration are known in the art. Packaging fabricated snack food chips in a stacked arrangement in cylindrical canisters is also known in the art and has been found to be popular for a number of reasons. Such canisters provide some degree of protection against breakage of the snack food chips, and they provide greater transportability of the snack food product, both in terms of bulk transport (i.e., large cartons of the canisters being shipped, e.g., from the manufacturer to the retailer) and in terms of the individual consumer being able to transport a single package of chips (e.g., in a purse or in a picnic basket). Additionally, the extended shelf life of a sealed canister of snack food chips as compared to a bag (commonly pillow-shaped and sometimes filled with a generally inert gas to prevent product degradation), as well as the ability to seal a canister with a snap-fit-type lid once the canister has been opened, makes a canister a particularly attractive packaging option.

In order to manufacture and package form-fried snack food chips efficiently, it is necessary to maintain control over the product configuration and arrangement throughout the fabrication process. In the past, this requirement has been met by using enclosed molds to shape or form the snack chips and to restrain them as they are transported through a cooking medium such as hot oil. However, not only is such an apparatus complex and therefore relatively prone to mechanical failure, but the complexity limits how close together the chips can be arranged in the production line and therefore limits the productivity of the apparatus. Additionally, the volume of oil or other cooking medium used with such apparatus also tends to be relatively large. Accordingly, the cost of operating the system is generally higher than would be desired.

SUMMARY OF THE INVENTION

The invention provides an apparatus and method for making fabricated snack food chips which are uniformly shaped and configured. The apparatus is compact and elegantly simple in design and overcomes the above-noted shortcomings extant in the prior art apparatus and methodologies.

In particular, the invention features a drum-type frying apparatus which transports snack food chip preforms through a relatively small volume of hot oil that is contained within a space formed between the drum and the surrounding wall of a housing in which the drum is supported. The drum has perforated mold elements disposed around its periphery, and the chip preforms are supported on the mold elements by drawing suction through the perforations.

A series of vacuum rollers transfer the uncooked chip preforms from a cutter roller assembly onto the mold elements using perforated pick-up and transfer members arranged around the perimeters of the vacuum rollers. Similarly, a take-off roller uses perforated pick-up and transfer members disposed around its perimeter to remove the cooked chips from the fryer drum. The cooked snack food chips are then removed from the take-off roller and transported downstream for subsequent processing (e.g., light re-oiling and seasoning) and packaging (e.g., in canisters, which may preferably conform to the contour or perimeter of the cooked chips).

The inventive apparatus and method allow one to produce form-fried snack food chips which are uniform in shape and configuration quickly and conveniently and with enhanced process control. Additionally, the amount of oil used in the process is minimized. Because relatively less oil is present in the apparatus at any given time as compared to prior art apparatus, the oil is used and replenished or "turned over" more frequently, and therefore the oil quality remains high.

Furthermore, and quite significantly, the configuration of the apparatus minimizes exposure of the oil to the ambient atmosphere. This is because whereas the two-piece prior art enclosed mold cavities presented multiple surfaces over which the oil could spread in the form of a film, thus creating a large oil surface area which could oxidize when exposed to the ambient air, the present invention utilizes just a single mold surface to shape the snack food product, thereby minimizing the amount of oil (in the form of an oil film spread over the metal surfaces) that is exposed to the atmosphere and that is susceptible to degrading oxidation. Additionally, the apparatus of the invention preferably includes means for controlling the nature of the atmosphere to which the oil is exposed. In particular, the portion of the apparatus where the snack food chips enter the fryer and are removed from the fryer preferably is shrouded, and an gas such as carbon dioxide or nitrogen is injected into the shrouded area to minimize exposure of the oil to oxygen. These features of the invention significantly improve the quality of the snack food chips produced by the system.

BRIEF DESCRIPTION OF THE DRAWINGS

The invention will now be described in greater detail in connection with the drawings, in which:

FIGS. 2A–2D are schematic side elevation, end, and perspective views showing the fryer mold elements used in connection with the apparatus of the invention;

FIG. 3 is a bottom view taken along the lines 3—3 in FIG. 2A;

DETAILED DESCRIPTION OF PREFERRED EMBODIMENTS

Figure 1:
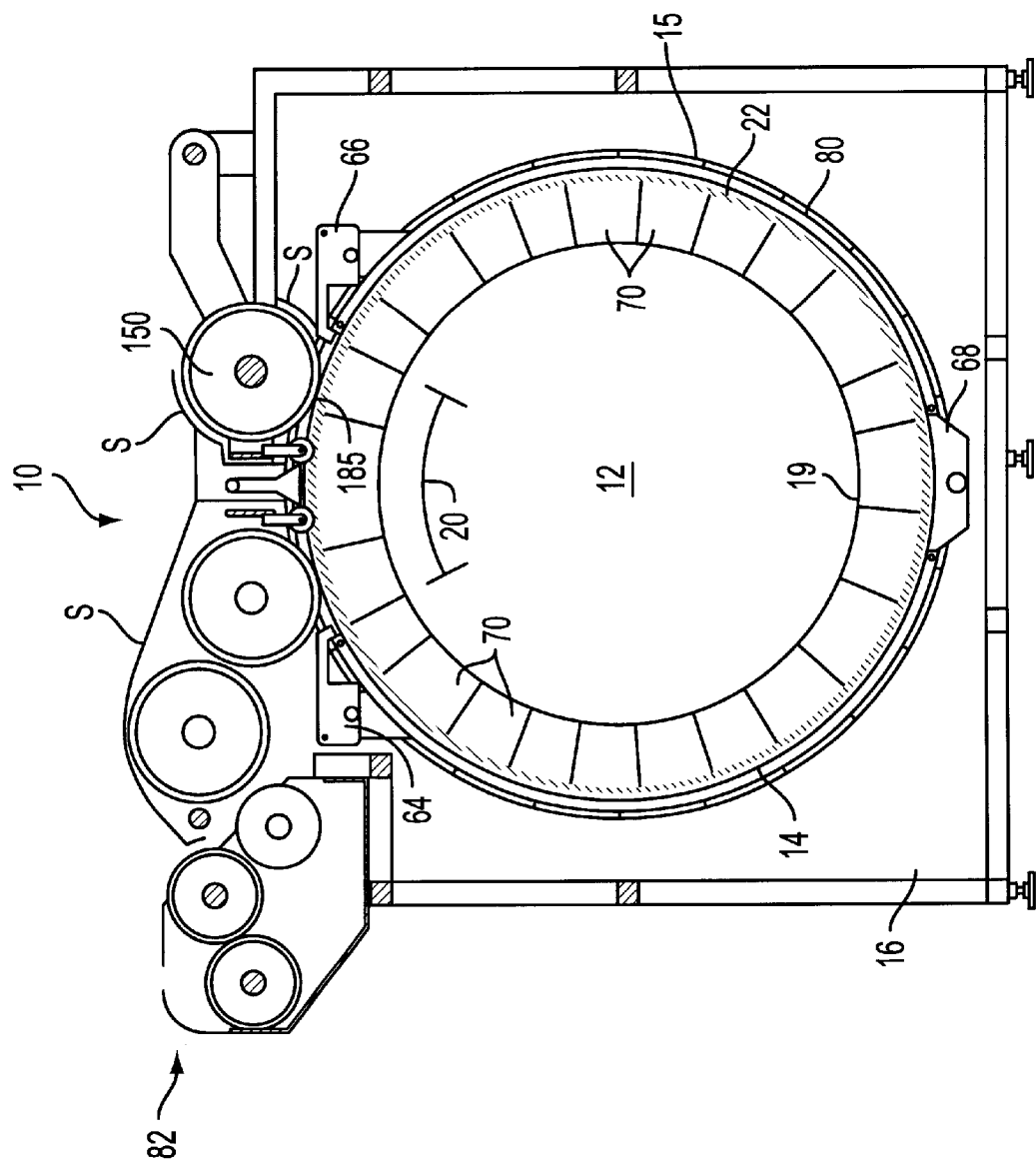
FIG. 1 is a schematic, side elevation view showing the fryer apparatus of the invention.

A preferred embodiment of a drum-type fryer apparatus 10 according to the invention is shown in FIG. 1. The "heart" of the apparatus is the drum 12, which is rotationally supported in a substantially closed cylindrical tank or chamber 14 defined between the drum 12 and the interior wall of a housing 16. A steam jacket 15 surrounds the tank and is used to keep oil in the tank 14 hot. End walls (not shown) are secured to the housing over the ends of the drum 12 so as to enclose substantially the tank or chamber 14, leaving it open only over the arcuate segment 20 along the upper portion thereof. Shrouding S is provided over the tank entrance/exit portion of the fryer, and inert gas such as nitrogen or carbon dioxide is injected through injection ports (not shown) into the shroud-enclosed regions of the apparatus to reduce exposure of the oil to the oil-degrading oxygen in the ambient atmosphere.

The drum has an outer ring 22 to which a large multiplicity (i.e., on the order of six thousand for commercial scale production) of frying mold elements are secured. As shown in FIGS. 2A–2D, each frying mold element 26 has an upper, mold portion 28 and a supporting stem portion 30 to which the mold portion 28 is joined by press fit engagement or means such as laser welding. Both portions of the frying mold elements 26 are fabricated from material such as stainless steel, aluminum, or other metals which can withstand the high temperature of the cooking oil (i.e., on the order of 340–400° F.). A high efficiency of thermal conductivity of the frying mold elements is important for cooking the chips thoroughly. In certain cases, the mold elements may utilize an ion conversion coating to facilitate release of the cooked chips therefrom.

Each mold portion 28 is fabricated such that its upper, molding surface 32 has a desired contour which will impart to the finished snack food chip the same contour. In the exemplary embodiment shown in the figures, the molding surface 32 is saddle-shaped with convex curvature about a first axis oriented in one direction and concave curvature about a second axis oriented perpendicular to the first axis. Alternatively, the molding surfaces 32 might be curved about just a single axis of curvature.

The stem portions 30 of the frying mold elements are each formed as a hollow cylinder which fits into an aperture 34 in the outer ring 22. Preferably, the frying mold elements 26 are configured to "snap" into position in the apertures 34 and to be held securely therein by means of retention fingers 36 and retention lugs 38 at the ends of the retention fingers. As the stem portions 30 of the frying mold elements are inserted into the apertures 34, the chamfered cam surfaces 40 of the retention lugs 38 will contact the edges 42 of the apertures 34 and force the retention fingers 36 inwardly. When the frying mold elements are properly seated, the retention fingers 36 will snap back into their original positions and engage shoulders 44 formed in the surfaces of the apertures, near the interior ends of the apertures to secure the frying mold element in place.

Preferably, the frying mold elements have break-away positioning tabs 46 which fit within slots (not shown) in the walls of the apertures 34 or, alternatively, in holes (not shown) in the surface 48 of the outer ring 22. This feature orients the frying mold elements properly within the apertures 34.

The apertures 34 also have beveled or cammed slide-out ramps 50 formed on their inner surfaces, with a slide-out ramp 50 provided for each retention finger/retention lug. (See FIGS. 2A and 3.) The frying mold elements can be removed from the outer ring 22, e.g., to be replaced or when it is desired to change to a different product configuration, by twisting them within the apertures with sufficient force to break off the positioning tabs 46. The cam surfaces 40 of the retention lugs will then slide against the cam surfaces 52 of the slide-out ramps 50 and the retention fingers 36 will be depressed inwardly. The retention lugs 38 thus will be moved out of engagement with the shoulder surfaces 44, and the frying mold elements can be removed from the apertures 34.

As further shown in FIGS. 2A–2C, each of the mold surfaces 32 is perforated, as indicated by stippling. By creating suction within the hollow interiors of the frying mold elements 26 via vacuum manifold system 19 as addressed below, the snack food chip preforms are pulled against the mold surfaces 32 by suction forces and transported through hot oil in the tank 14. The perforations should be small enough to prevent dough from accumulating in them, but large enough to draw a sufficiently strong vacuum through them to retain the chips.

The mold surfaces 32 also have a series of channels or grooves 60 formed therein. Thus, the mold surfaces 32 will have a desired texture; that texture is imparted to the snack food chips by virtue of the chip preforms being pulled against the mold surfaces 32 by the suction forces, and that texture enhances the "mouth feel" of the chips and adds strength to the chips. Significantly, the grooves or channels 60 also facilitate the circulation of oil around the chips—particularly across the surfaces of the chips that are adjacent to the mold surfaces 32—thereby providing more uniform cooking of the chips. Moreover, as the oil circulates through the grooves 60, steam (formed from moisture released by the snack food product as it is fried) which has mixed with the oil is drawn off by the suction forces used to hold the chips against the mold surfaces. This helps to reduce the necessary total cooking time, since the relative amount of oil (which is hotter than the steam) to which the chips are exposed is increased, and thus the rate of product throughput can be increased.

Furthermore, the surface texture can be specifically tailored to facilitate release and removal of the cooked chips from the mold surfaces 32 by, for example, providing grooves or channels which all extend in the same direction and/or by controlling the depth and spacing of the grooves or channels. (This concept can be extended to making the channels deep enough and wide enough to produce a ridged or sinusoidally "wavy" chip.) The mold elements may be changed simply to change the texture of the final product, if so desired.

Figure 2E:
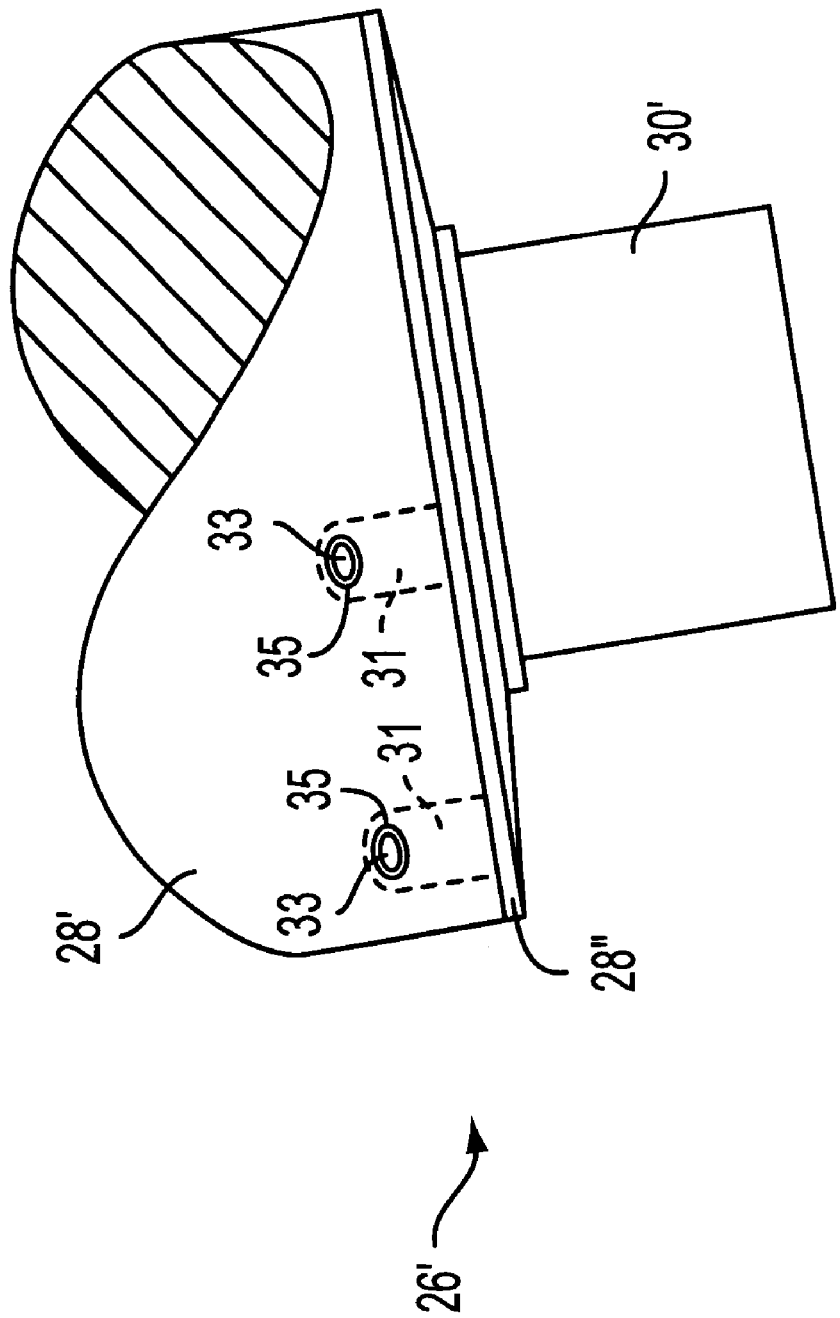
FIG. 2E is a schematic perspective view showing an alternate configuration of the fryer mold elements used in connection with the apparatus of the invention.

An alternate configuration of a frying mold element 26' is shown in FIG. 2E. In this configuration, the frying mold element includes an upper, mold portion 28' and a lower, base portion 28" to which the mold portion 28' is connected. The base portion 28" has a number of spring release fingers 31—preferably two on either side of the element 26'—extending upward from it. Each of the spring release fingers 31 has a circular locking tab 33 at its end. The upper, mold portion 28' is generally hollow and fits down over the spring release fingers, with the spring release fingers located in the interior of the mold portion as indicated by the dashed line depiction of the spring release fingers. The locking tabs 33 engage apertures 35 formed in the sidewalls of the mold portion 28' to secure the mold portion 28' to the base portion 28". The mold portion 28' can be changed quite easily by pressing in on the locking tabs to release the mold portion and simply lifting the mold portion off of the base portion.

With this configuration, the supporting stem portion 30' can be simpler than in the preceding configuration. For example, it may be formed with a slight amount of taper and secured to the outer ring 22 of the drum 12 by being press-fit into the cylindrical apertures 34. (See FIG. 2A.)

Referring back to FIG. 1, the outer ring 22 is supported on the perimeter of the drum 12, and the apparatus is configured such that the main body of the drum remains stationary and the outer ring 22 rotates around it with the frying mold elements 26 secured thereto. The interior of the drum includes a manifold system 19. The manifold system is used to maintain a relatively constant level of force against the chips as they rotate through the tank 14, regardless of their rotational position within the tank. In particular, it will be appreciated that the hydraulic pressure of the oil (which is injected into the tank 14 via inlet weir 64 and drawn out of the tank via outlet weir/filter 66) will be higher at the bottom of the tank, in the region of oil sump 68, than near the top of the tank. In a commercial-scale installation, for example, in which the drum will be on the order of fourteen feet in diameter and six feet wide (depending on desired product throughput), the oil pressure at the bottom of the tank (e.g., in the sump 68) will be on the order of five or six psi.

It is preferable for the pressure differential across the chip to remain relatively constant through the frying process (preferably on the order of a pressure head equivalent to ten inches of water (0.36 psi)) so as to prevent the pressure from pushing the soft chip preforms into the perforations and grooves in the mold surfaces 32. Therefore, the manifold system consists of a number of smaller suction cells or chambers 70 which extend from one end of the drum 12 to the opposite end. A system of valves or pressure reducers (not shown) is used to control the level of suction being drawn through each of the individual cells 70 such that the net pressure differential across the chip remains relatively constant at the desired value, i.e., ten inches of water. Thus, more suction will be drawn in the cells 70 near the upper portion of the apparatus than in the cells 70 near the lower portion of the apparatus because, near the bottom of the apparatus, the weight-induced pressure of the oil itself will help to keep the snack food chip preforms secured against the molding surfaces 32.

Figure 4:
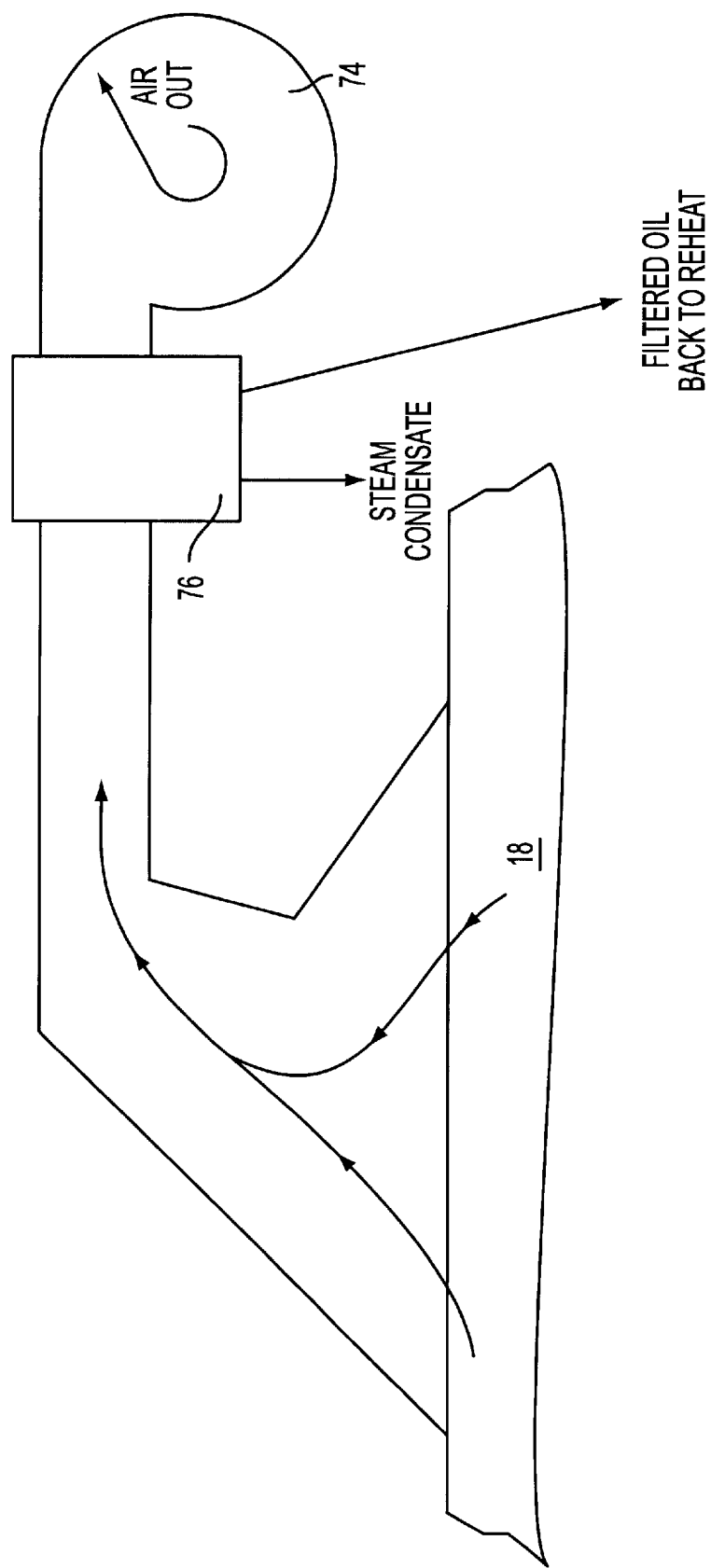
FIG. 4 is a schematic diagram illustrating the system for creating suction within the fryer drum of the invention.

As illustrated in FIG. 4, suction is created within the manifold system 19 by means of a blower 74. As air is drawn out of the vacuum plenum by means of the blower, oil which has been pulled through the perforations in the mold surfaces 32 (either by circulating around the snack food chips or by being pulled through the pores of the snack food chips, which enhances cooking) will be pulled out of the vacuum plenum as well. Additionally, steam produced from moisture released by the snack food chips during the frying process will also be drawn out of the plenum. Accordingly, a separator 76 is provided to remove oil and steam from the air being drawn out of the plenum 18; the oil is collected, filtered, and then recycled.

Figure 5:
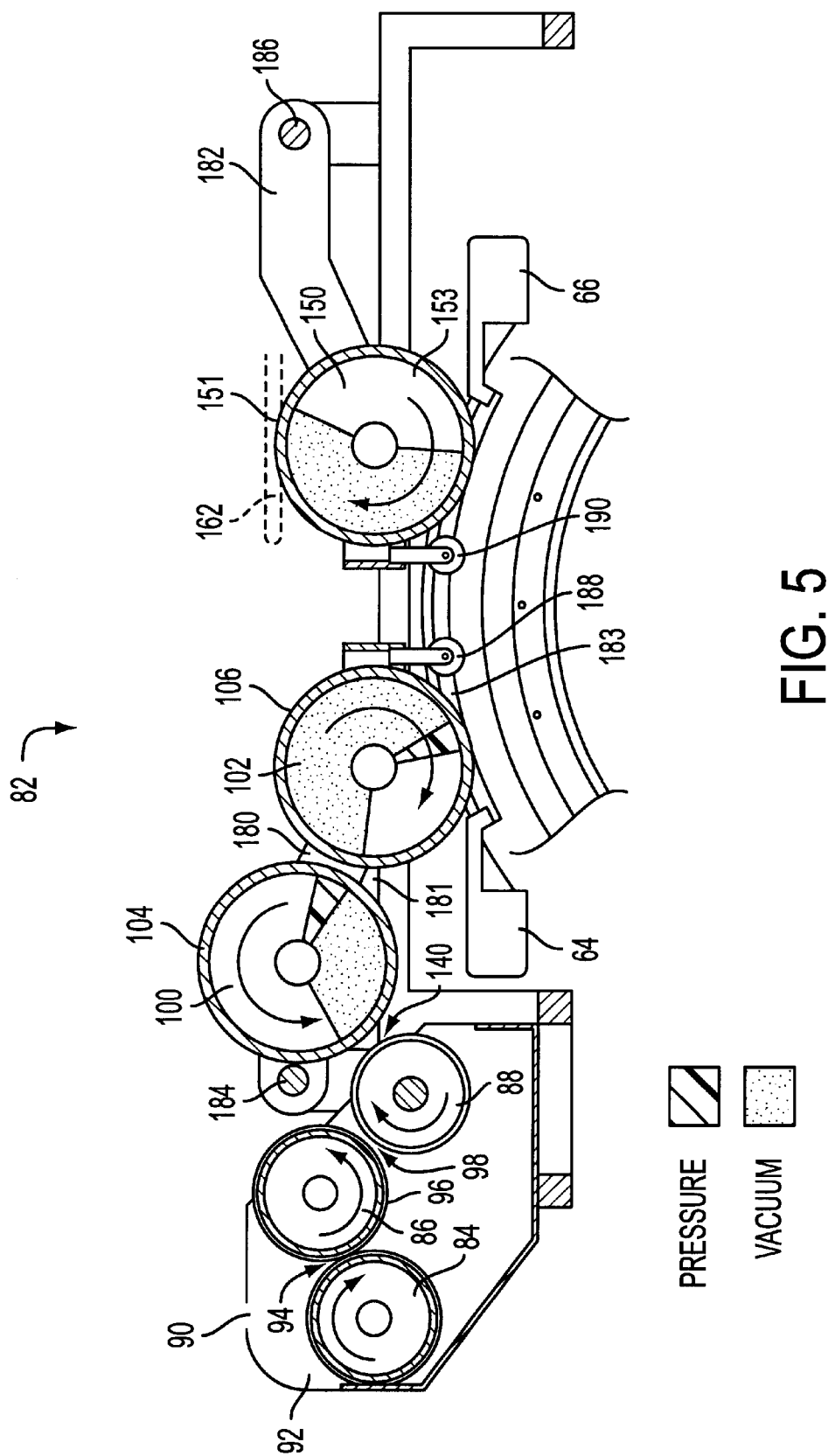
FIG. 5 is a schematic, side elevation view showing the cutter, feed, and take-off roller system located at the top of the apparatus in FIG. 1 in greater detail.
Figure 8:
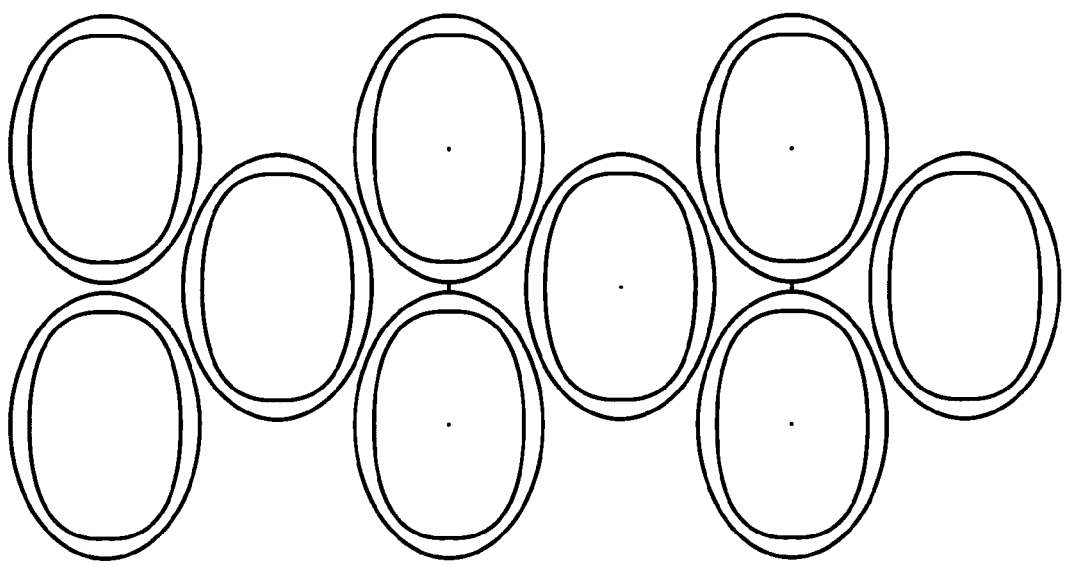
FIG. 8 is a schematic depiction of a preferred cutting pattern used to make form-fried potato crisps according to the invention.

The frying apparatus 10 further includes a system 82 of cutter, transfer, feed, and take-off rollers. As shown in FIG. 5, the system 82 includes sheeter rollers 84, 86 and cutter roller 88, which may be relatively conventional in construction. For making stackable, fabricated potato chips, the cutter roller preferably produces a cutting pattern as shown in FIG. 8. Notably, because the drum-type fryer assembly of the invention is so simple in construction and does not rely on complex two-piece molds to restrain the snack food chips as they are transported through the oil, the chips can be cut from the sheet of dough in the relatively tightly packed or "nested" configuration shown in FIG. 8. (Other shaped snack food products may also be made using the apparatus and method of the invention, and the configuration of the cutter roller will vary accordingly.)

Figure 6:
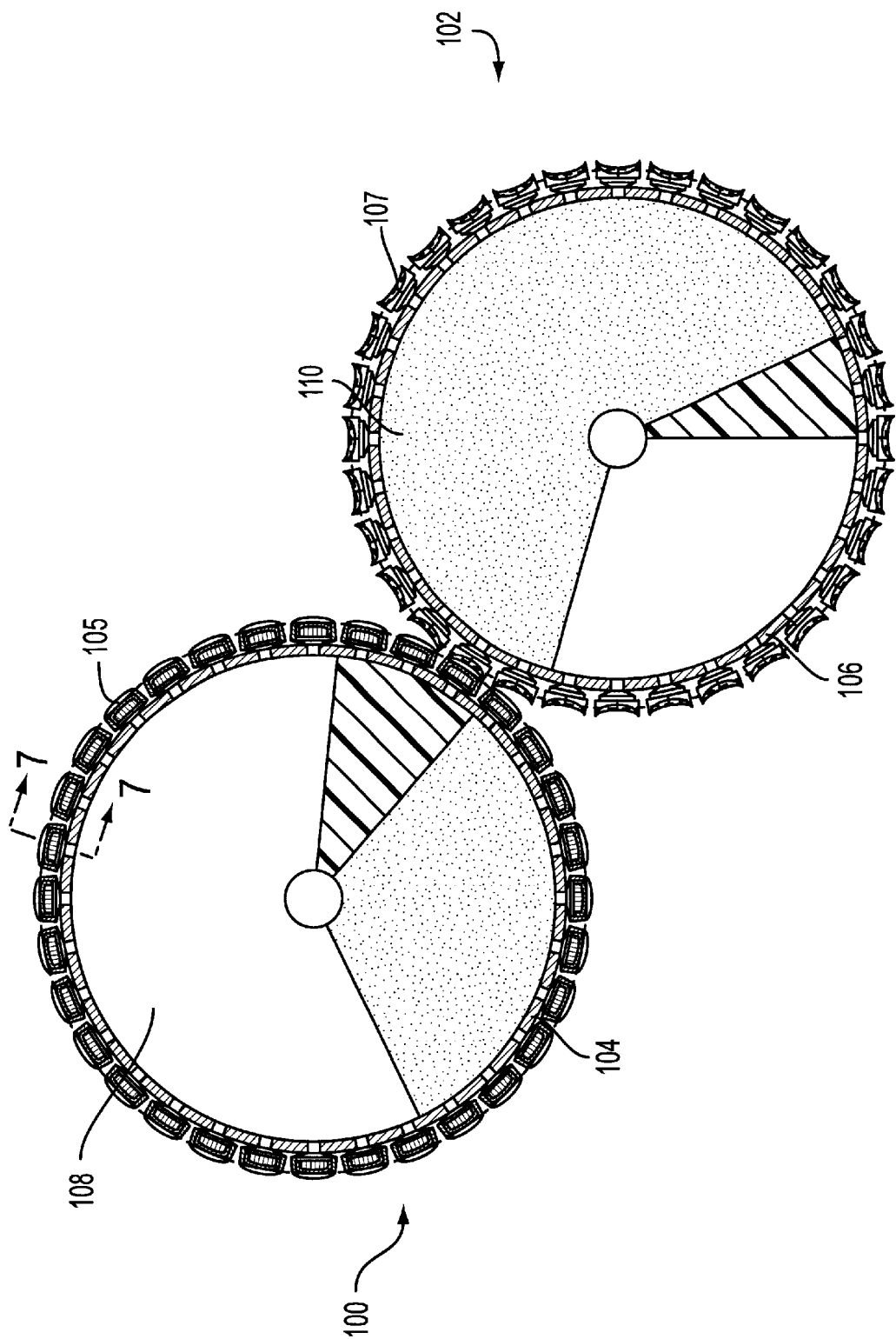
FIG. 6 is a schematic, side elevation view showing the transfer roller and feed roller shown in FIG. 5 in greater detail.

The system of rollers 82 further includes an intermediate transfer roller 100 and a feed roller 102. As shown in greater detail in FIGS. 6 and 7, each of these rollers is constructed with an outer ring 104, 106, respectively, with a large multiplicity of pick-up and transfer members 105, 107, respectively, disposed thereon. The outer rings 104, 106 rotate in the directions indicated by the arcuate arrows (FIG. 5) around vacuum/over-pressure drums 108, 110, respectively. The drums 108 and 110 are constructed with blowers and manifold systems (not shown) configured to create suction in the sectors indicated by stippling and over-pressure in the sectors indicated by cross-hatching.

Figure 7:
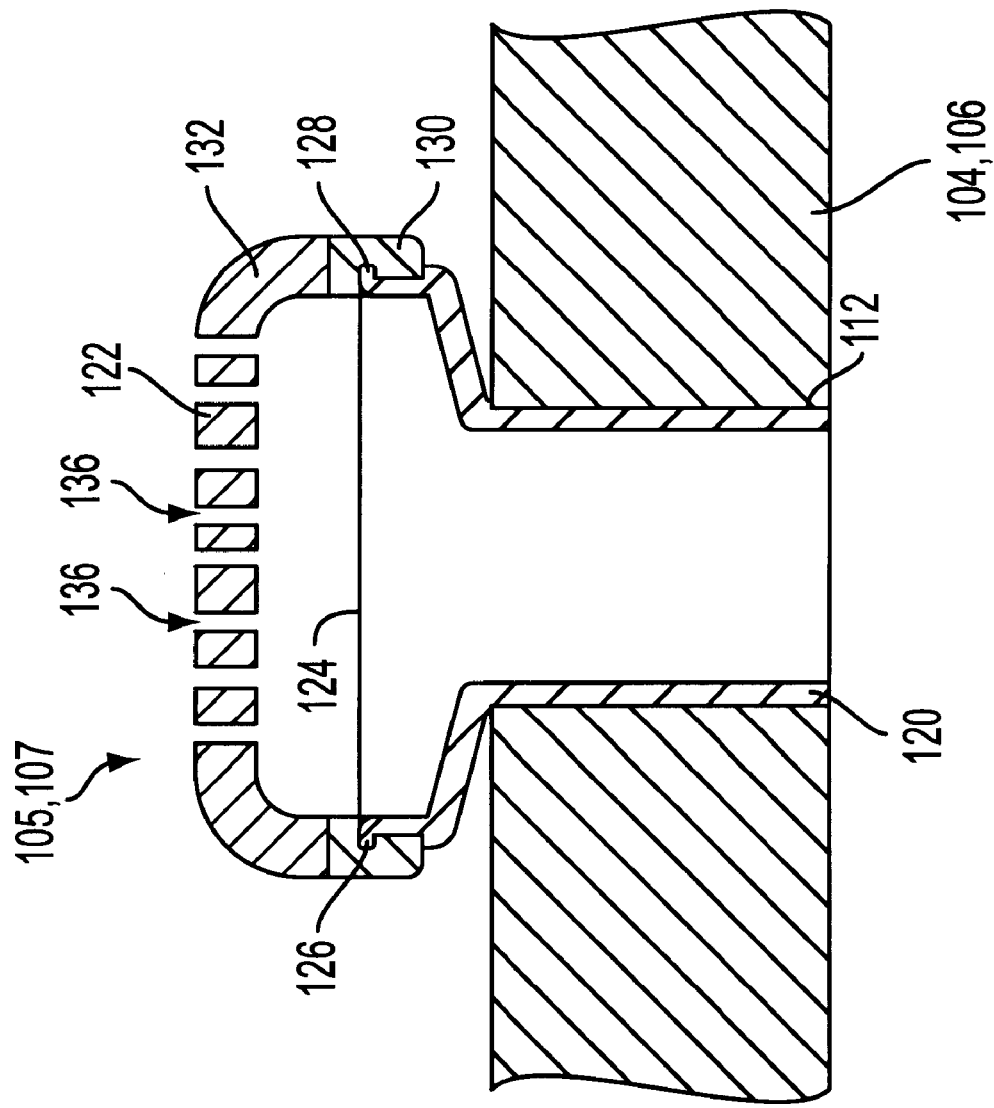
FIG. 7 is a section view of a pick-up and transfer member used on the rollers shown in FIG. 6 taken along the lines 7—7 therein.

As shown in greater detail in FIG. 7, each of the pick-up and transfer members 105, 107 consists of a generally mushroom-shaped element which is secured by means of a press fit in an aperture 112 in the outer ring 104 or 106. Each of the members 105 or 107 is fabricated from a hollow support stem 120 and a silicone rubber picker pad 122. The picker pad 122 fits over the open upper end 124 of the stem 120 and is retained thereon by means of a lip 126 at the upper end of the stem, which lip mates with a groove 128 formed on the inside surface of the picker pad 122. The picker pad preferably is sized for a stretch fit over the open end of the stem 120. Furthermore, as indicated in FIG. 7, it is preferable for the portion of the picker pad which fits over the end of the stem to be harder than the upper or distal-most portion of the picker pad. For example, the portion 130 preferably has a hardness value of 70–80 durometer, whereas the upper portion 132 preferably has a hardness value on the order of 15 durometer. This configuration provides the strength necessary to keep the picker pads secured to the stems 120 while permitting the picker pads to flex slightly as they transfer the snack food chips from one roller to another, as described in greater detail below.

As further indicated in FIG. 7, the upper portions 132 of the picker pads have perforations 136 extending through them. The perforations are provided such that the vacuum created within the stippled sectors of the rollers 100, 102 and the over-pressure created within the cross-hatched sectors will be transmitted through the picker pads to cause the snack food chip preforms to adhere to the pick-up members or be blown off of the pick-up members at the appropriate times, as described in greater detail below in connection with operation of the apparatus.

Finally, with respect to the pick-up and transfer members of the transfer roller 100 and the feed roller 102, it will be appreciated that the snack food chip preforms will be almost completely flat (i.e., with just a slight amount of curvature due to the curvature of the cutter roller 88) at the nip 140 where the transfer roller 100 picks the preforms off of the cutter roller 88, whereas the mold surfaces 32 of the frying mold elements 26 are far more curved. Accordingly, the pick-up and transfer members 105, 107 are configured to stretch the chip preforms gradually and progressively to have the desired shape at the time they are deposited onto the frying mold elements 26. This gives better shape to the chips and prevents the dough from being torn, which would be more likely if the dough were stretched into the final product shape all in one step. The picker pads on the rollers 100, 102 are of complimentary or mating configuration and fit together to provide for secure, positive transfer from one roller to the next; the picker pads of the feed roller 102 are similarly complimentarily configured to mate with the mold surfaces 32 to provide positive transfer from the feed roller onto the fryer drum.

The system 82 further includes a pick-off roller 150 which is used to remove cooked snack food chips from the fryer drum, and a transfer conveyor assembly 160 (FIGS. 10–12) which features finger conveyors to remove the cooked snack food chips from the pick-off roller 150 and transfer them downstream for subsequent processing.

Figure 9:
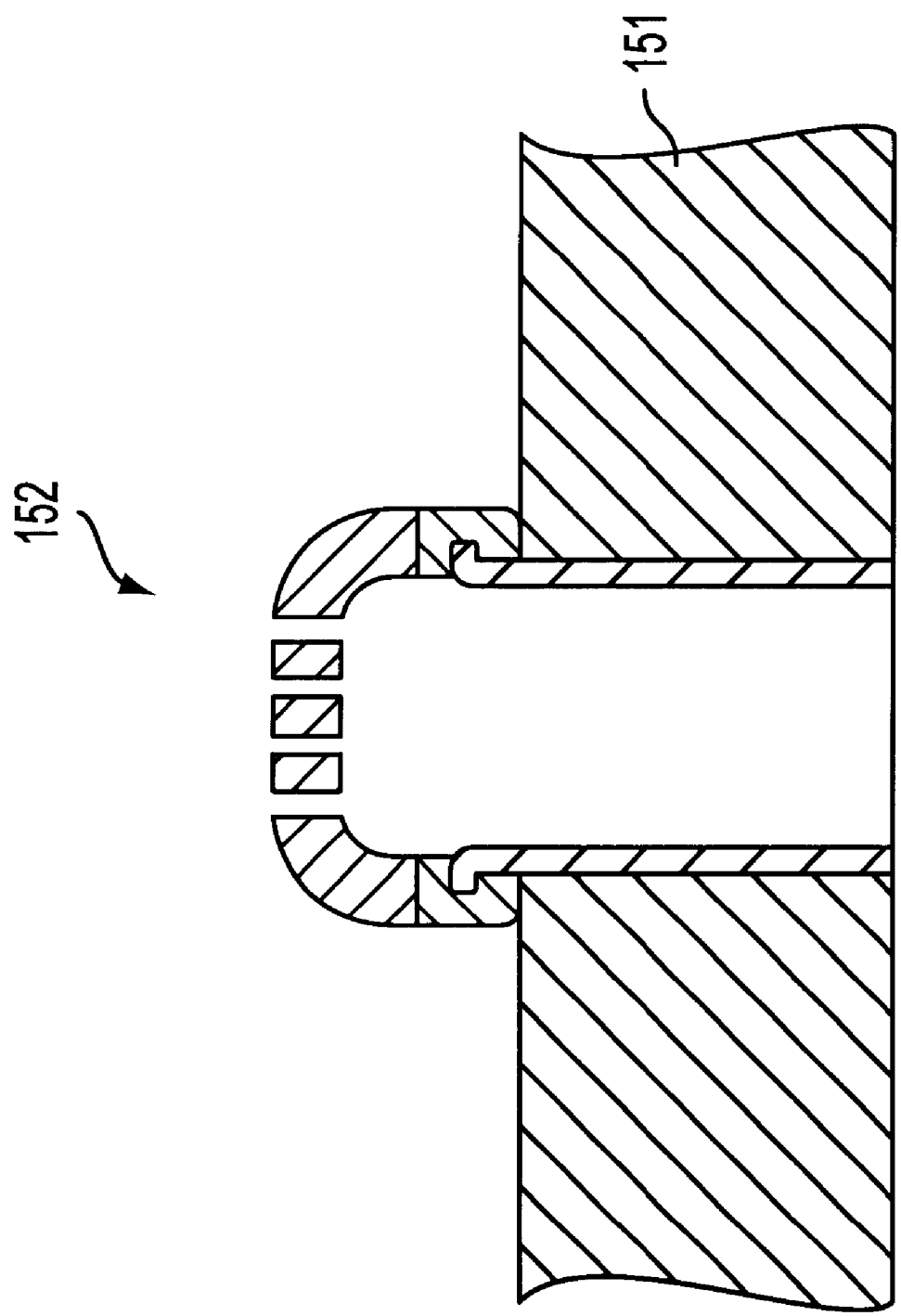
FIG. 9 is a section view, similar to the section view of FIG. 7, illustrating the pick-up and transfer members used on the take-off roller.
Figure 10:
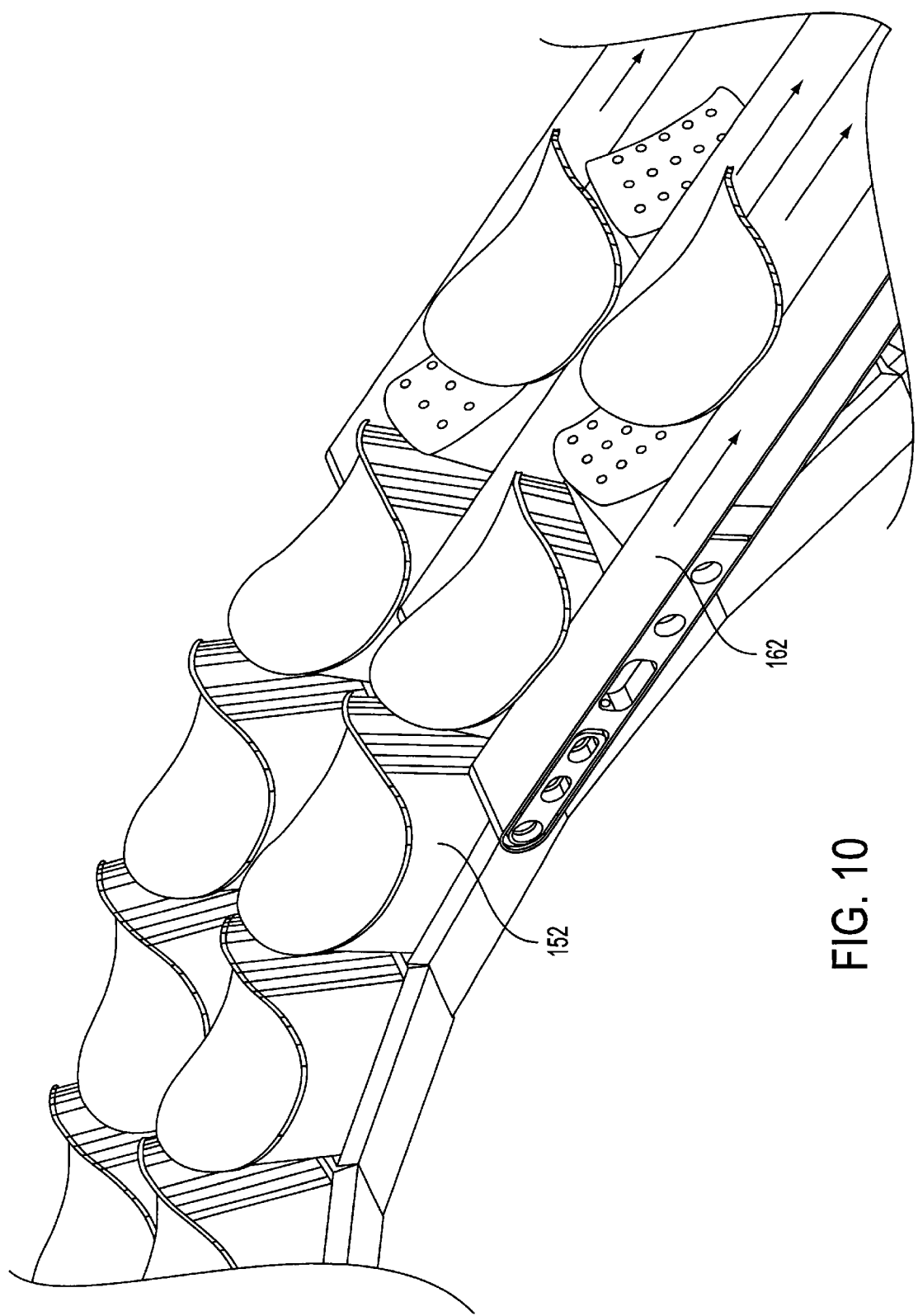
FIGS. 10–12 are two schematic perspective views and a schematic, side-elevation view illustrating removal of cooked snack food chips from the frying apparatus of the invention.
Figure 11:
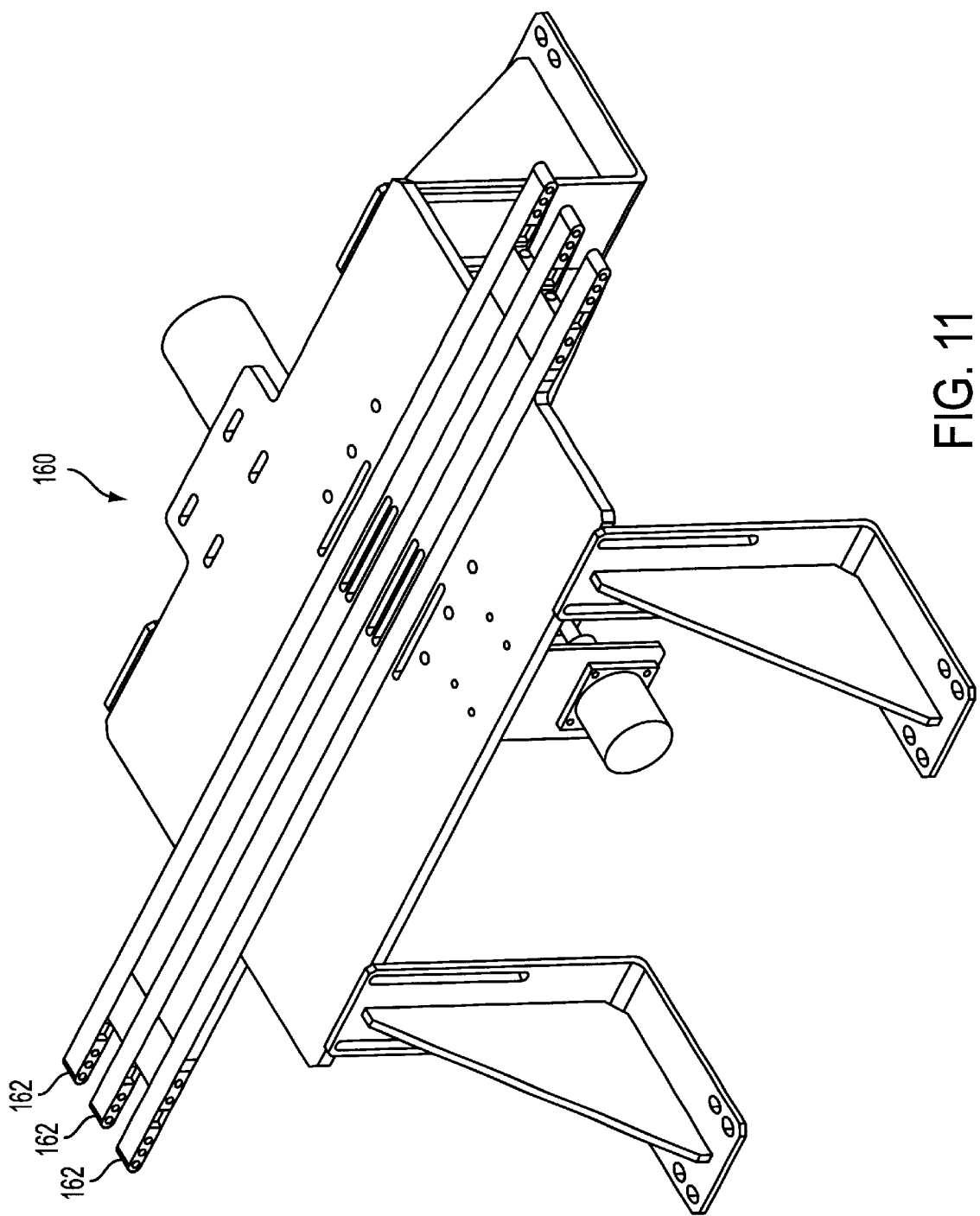
Figure 12:
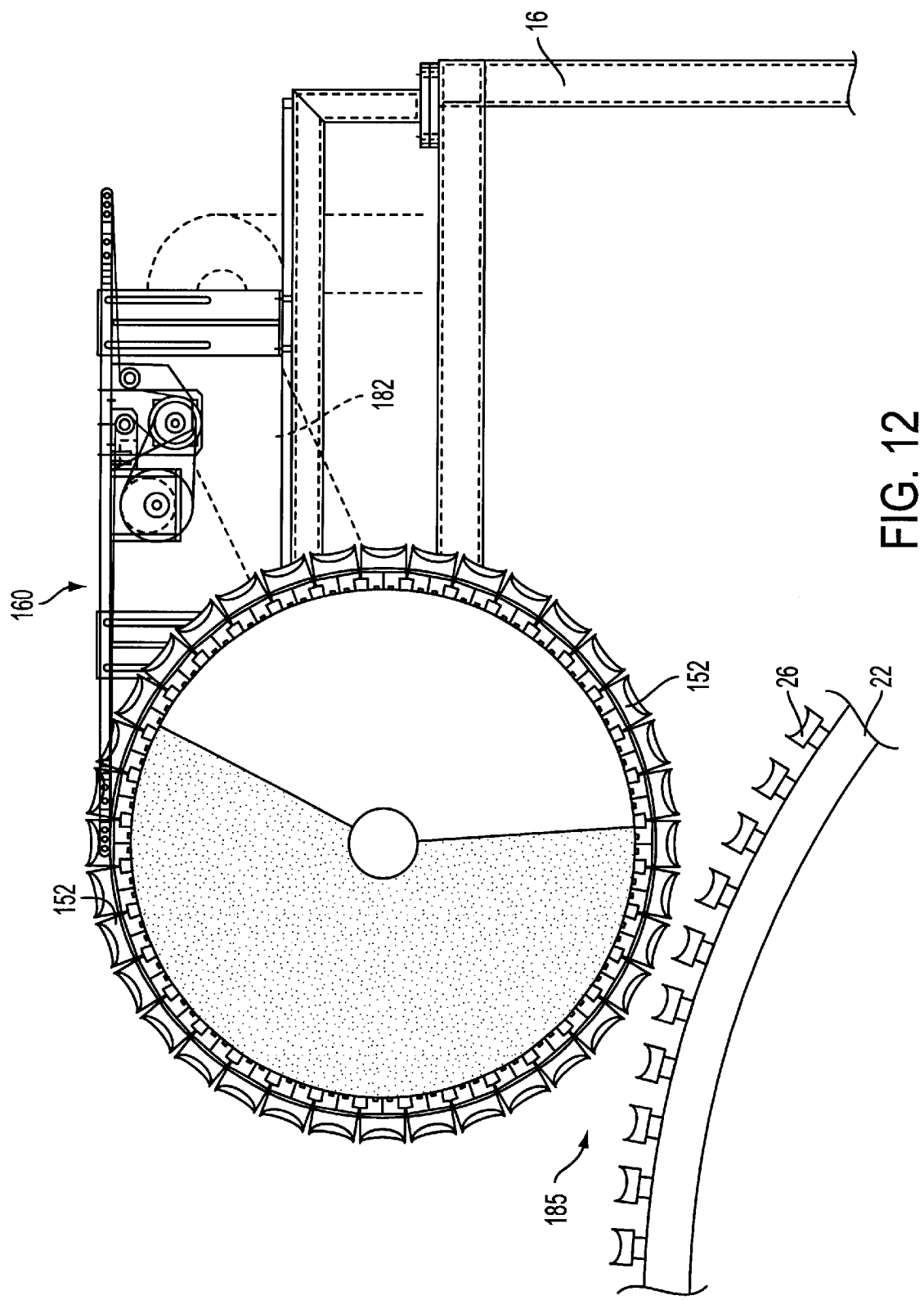

The pick-off roller 150 is constructed generally similarly to the transfer roller 100 and feed roller 102 in that it includes an outer ring 151 which rotates relative to a vacuum drum 153, and pick-up and transfer members 152 secured thereto. The pick-up and transfer members 152 are constructed generally similarly to the pick-up members 105, 107 on the transfer roller and feed roller 102, respectively, in that they are generally hollow and have apertures formed through picker pads disposed on their upper ends to transmit suction forces to the cooked snack food chips which have been retrieved from the fryer drum by the roller 150. As shown in FIG. 9, however, the pick-up and transfer members 152 are narrower than the pick-up and transfer members on the transfer and feed rollers 100, 102. This allows the fingers 162 of the transfer conveyor assembly 160 to fit between the pick-up and transfer members 152, as illustrated in FIGS. 10 and 12. Additionally, the drum of the pick-off roller 150 has a sector, indicated by stippling, which extends from the bottom portion of the roller to slightly past the top portion of the roller. This configuration permits the pick-off roller 150 to pick the cooked snack food chips off of the fryer drum located below it and transfer them to the fingers 162 of the take-away conveyor apparatus.

Finally, with respect to the roller system 82, the various rollers are mounted on arms 180 and 182 which pivot around pivot points 184 and 186, respectively. Cam followers 188, 190 are attached at the free ends of the arms 180, 182 and follow the perimeter of the fryer drum to ensure proper positioning of the various rollers.

The apparatus of the invention operates as follows. Dough (e.g., a farinaceous dough such as potato dough or corn dough) is fed to the sheeter rollers 84, 86 through slot 90 in the housing 92. The sheeter rollers form the dough into a sheet which adheres to the lower portion of the roller 86 as it rotates. The dough sheet is then cut into appropriately shaped snack food chip preforms by the cutter roller 88.

The die-cut sheet of dough is carried over the top of the cutter roller 88, and the die-cut chip preforms are picked off of the cutter roller 88 by the pick-up and transfer members 105 of the transfer roller 100. Suction created within the portion of the drum 108 indicated by stippling (FIGS. 5 and 6) acts through the perforations in the picker pads and causes the chip preforms to adhere thereto. Excess or "lace" dough is removed from the cutter roller 88 and may be recycled if so desired.

The chip preforms are carried around the lower portion of the transfer roller 100 to the nip 181 formed between the transfer roller 100 and the feed roller 102. At that point, overpressure created within the cross-hatched portion of the transfer roller drum 108 facilitates transfer of the chip preforms from the pick-up and transfer members 105 of the transfer roller 100 to the pick-up and transfer members 107 of the feed roller 102. The chip preforms are then carried by the members 107 around the upper portion of the feed roller 102 and down to the point 183 where the feed roller and drum fryer 12 converge. At this point, overpressure in the cross-hatched portion of the feed roller drum 110 (FIGS. 5 and 6) positively transfers the chip preforms onto the frying mold elements 26 of the fryer drum 12. The chip preforms are then cooked by being transported through hot oil in the tank 14—specifically, hot oil contained within the space between the outer ring 22 of the drum 12 and the inside surface 17 of the housing (see FIG. 2A), which preferably is on the order of just one inch wide.

The temperature of the oil and the dwell time of the chips within the oil (determined by the size of the drum 12 and its rate of rotation) are controlled for the specific dough being used so that the chips are properly cooked (e.g., have a desired moisture content) by the time they have been carried around the drum to the nip 185 formed between the outer ring 22 of the fryer drum and the take-off roller 150. At that point, the pick-up and transfer members 152 of the take-off roller 150 lift the now-cooked snack food chips off of the mold surfaces of the frying mold elements 26 (by virtue of suction within the take-off roller drum), and the take-off roller transports the now-cooked snack food chips from the bottom portion of the roller to the top portion of the roller.

As shown in detail in FIG. 10, the pick-up and transfer elements 152 of the take-off roller 150 pass between the fingers 162 of the take-away conveyor assembly 160, with the edges of the snack food chips overlying the edges of the finger conveyors 162. As the pick-up and transfer members 152 rotate down and away from the snack food chips, the chips will be supported by the finger conveyors 162 and are transported downstream, away from the fryer apparatus, for subsequent processing such as seasoning and packaging.

Although the invention has been described in some detail, it will be apparent to those having skill in the art that numerous modifications and revisions to the embodiments disclosed herein may be made. For example, other types of snack food chips such as tortilla chips may be made using the invention, and snack food chips made according to the invention do not necessarily have to be oval and/or saddle-shaped. For example, it is contemplated that round snack food chips, rectangular snack food chips, or triangular snack food chips (such as tortilla chips) can be made using the apparatus and methodology of the invention, and it is also contemplated that the specific curvature of chips made using the invention can be varied. For example, single-curve chips can be made, or chips can be made which are multiply curved about axes that are parallel to each other. These and other such modifications are deemed to be within the scope of the following claims.

We claim the following:

1. An apparatus for cooking snack food piece preforms in a cooking medium to produce cooked snack food pieces, said apparatus comprising:
   a vacuum drum disposed within a cooking medium tank and having an outer surface, said vacuum drum having a plurality of mold elements disposed around said outer surface,
   wherein said vacuum drum is configured such that said mold elements rotate within said cooking medium tank, and
   wherein said mold elements have open mold surfaces against which the snack food piece preforms are held, said mold surfaces being perforated such that vacuum created within said vacuum drum acts on the snack food piece preforms to hold the snack food piece preforms against said mold surfaces, said apparatus further comprising a feed roller which places the snack food piece preforms on said mold elements and a take-off roller which removes the cooked snack food pieces from said mold elements.

2. The apparatus of claim 1, wherein said vacuum drum comprises an outer ring which rotates relative to a central vacuum chamber and to which said mold elements are attached.

3. The apparatus of claim 1, wherein said mold elements are configured to be removable from said vacuum drum and replaceable.

4. The apparatus of claim 1, wherein said mold elements comprise stem portions which secure said mold elements to said vacuum drum and upper mold portions which extend beyond the outer surface of said vacuum drum, said mold surfaces being formed on said upper mold portions.

5. The apparatus of claim 1, wherein said mold surfaces are curved about a single axis of curvature.

6. The apparatus of claim 1, wherein said mold surfaces are curved about a plurality of axes of curvature.

7. The apparatus of claim 6, wherein said mold surfaces are convexly curved about a first axis of curvature and concavely curved about another other axis of curvature parallel to the first axis of curvature such that said mold surfaces are saddle-shaped.

8. The apparatus of claim 1, wherein said mold surfaces each have a series of grooves or channels which impart a surface texture thereto.

9. The apparatus of claim 8, wherein said grooves or channels are sufficiently dimensioned to permit the cooking medium to circulate therethrough, whereby the cooking medium is able to pass between said mold surfaces and the snack food piece preforms held thereagainst.

10. The apparatus of claim 8, wherein said grooves or channels are configured to facilitate removal of the cooked snack food pieces therefrom.

11. The apparatus of claim 8, wherein said grooves or channels are configured to produce ridged or sinusoidally wavy snack food pieces.

12. The apparatus of claim 1, wherein said cooking medium tank conforms generally to the shape of said vacuum drum so as to minimize the volume of the cooking medium contained therein.

13. The apparatus for claim 12, wherein said vacuum drum is substantially enclosed within said cooking medium tank, with a portion subtending an arc of approximately zero to sixty-five degree extending out of the cooking medium tank and positioned to receive the snack food piece preforms from said feed roller and to provide the cooked snack food pieces to said take-off roller.

14. The apparatus of claim 1, wherein said vacuum drum comprises a manifold system which distributes suction forces circumferentially about said vacuum drum in zones.

15. The apparatus of claim 14, wherein said manifold system is configured such that higher suction forces are created within upper portions thereof than in lower portions thereof.

16. The apparatus of claim 15, wherein said manifold system is calibrated to the cooking medium so as to maintain a substantially constant pressure differential across the snack food piece preforms held against said cooking surfaces.

17. The apparatus of claim 1, further comprising a die-cutting sheeter roller assembly which produces the snack food piece preforms and provides the snack food piece preforms to said feed roller.

18. The apparatus of claim 17, further comprising a transfer roller disposed between said die-cutting sheeter roller assembly and said feed roller, whereby said transfer roller transfers the snack food piece preforms from said die-cutting sheeter roller assembly to said feed roller.

19. The apparatus of claim 18, wherein said transfer roller and said feed roller are configured to reshape the snack food piece preforms gradually from essentially flattened to a shape which conforms essentially to said open mold surfaces.

20. The apparatus of claim 1, wherein said feed roller comprises a feed roller vacuum drum and pickup and transfer members disposed around the periphery of said feed roller vacuum drum.

21. The apparatus of claim 20, wherein said pickup and transfer members comprise perforated, flexible picker pads which support the snack food piece preforms.

22. The apparatus of claim 18, wherein said transfer roller comprises a transfer roller vacuum drum and pickup and transfer members disposed around the periphery of said transfer roller vacuum drum.

23. The apparatus of claim 22, wherein said pickup and transfer members comprise perforated, flexible picker pads which support the snack food piece preforms.

24. The apparatus of claim 1, wherein said take-off roller comprises a take-off roller vacuum drum and pickup and transfer members disposed around the periphery of said take-off roller vacuum drum.

25. The apparatus of claim 24, wherein said pickup and transfer members comprise perforated, flexible picker pads which support the snack food piece preforms.

26. The apparatus of claim 1, further comprising a take-away conveyor apparatus disposed adjacent to said take-off roller to receive the cooked snack food pieces from the take-off roller and transport the cooked snack food pieces away from said apparatus.

27. The apparatus of claim 26, wherein said take-off roller comprises a take-off roller vacuum drum and pickup and transfer members disposed around the periphery of said take-off roller vacuum drum, and wherein said take-away conveyor apparatus comprises finger-type conveyors which fit between the pickup and transfer members.

28. The apparatus of claim 1 further comprising a shroud arranged over a tank entrance/exit portion of the fryer for reducing exposure of the frying oil to oxygen.

* * * * *